United States Patent [19]

Butler

[11] 4,290,066

[45] Sep. 15, 1981

[54] HIGH SPEED ADAPTIVE CLUTTER FILTER

[75] Inventor: Walker Butler, Scottsdale, Ariz.

[73] Assignee: Motorola Inc., Schaumburg, Ill.

[21] Appl. No.: 84,265

[22] Filed: Oct. 12, 1979

[51] Int. Cl.³ ............................................... G01S 7/28
[52] U.S. Cl. .................................. 343/17.1 R; 343/7.5
[58] Field of Search ................... 343/7 A, 17.2 R, 7.5, 343/17.1 R

[56] References Cited

U.S. PATENT DOCUMENTS

| | | | |
|---|---|---|---|
| 3,218,641 | 11/1965 | Maynard | 343/17.2 R |
| 3,341,847 | 9/1967 | Fried et al. | 343/7.5 |
| 3,465,336 | 9/1969 | Fishbein et al. | 343/7 A |
| 3,576,564 | 4/1971 | Galvin | 343/17.1 R |
| 3,737,900 | 6/1973 | Vehrs, Jr. | 343/17.1 R |
| 3,775,768 | 11/1973 | Lisle et al. | 343/17.1 R |
| 3,992,709 | 11/1976 | Watanabe et al. | 343/7.5 |

Primary Examiner—S. C. Buczinski

[57] ABSTRACT

Method and apparatus for eliminating the effects of clutter in a coherent pulsed Doppler radar including determining the center frequency of the clutter and periodically moving the local oscillator frequency so that the clutter is shifted out of the Doppler filter passband, leaving only targets in the passband.

4 Claims, 10 Drawing Figures

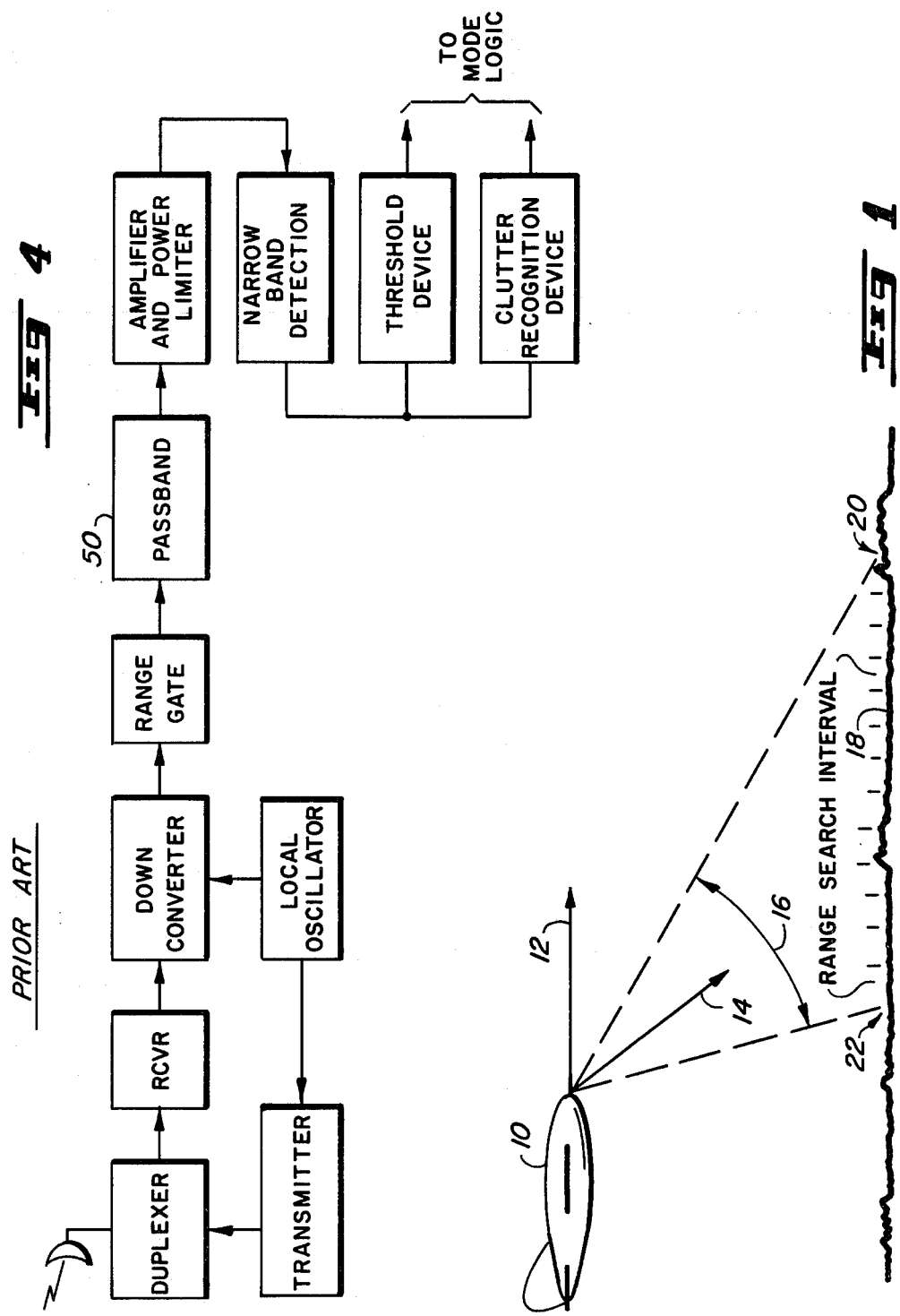

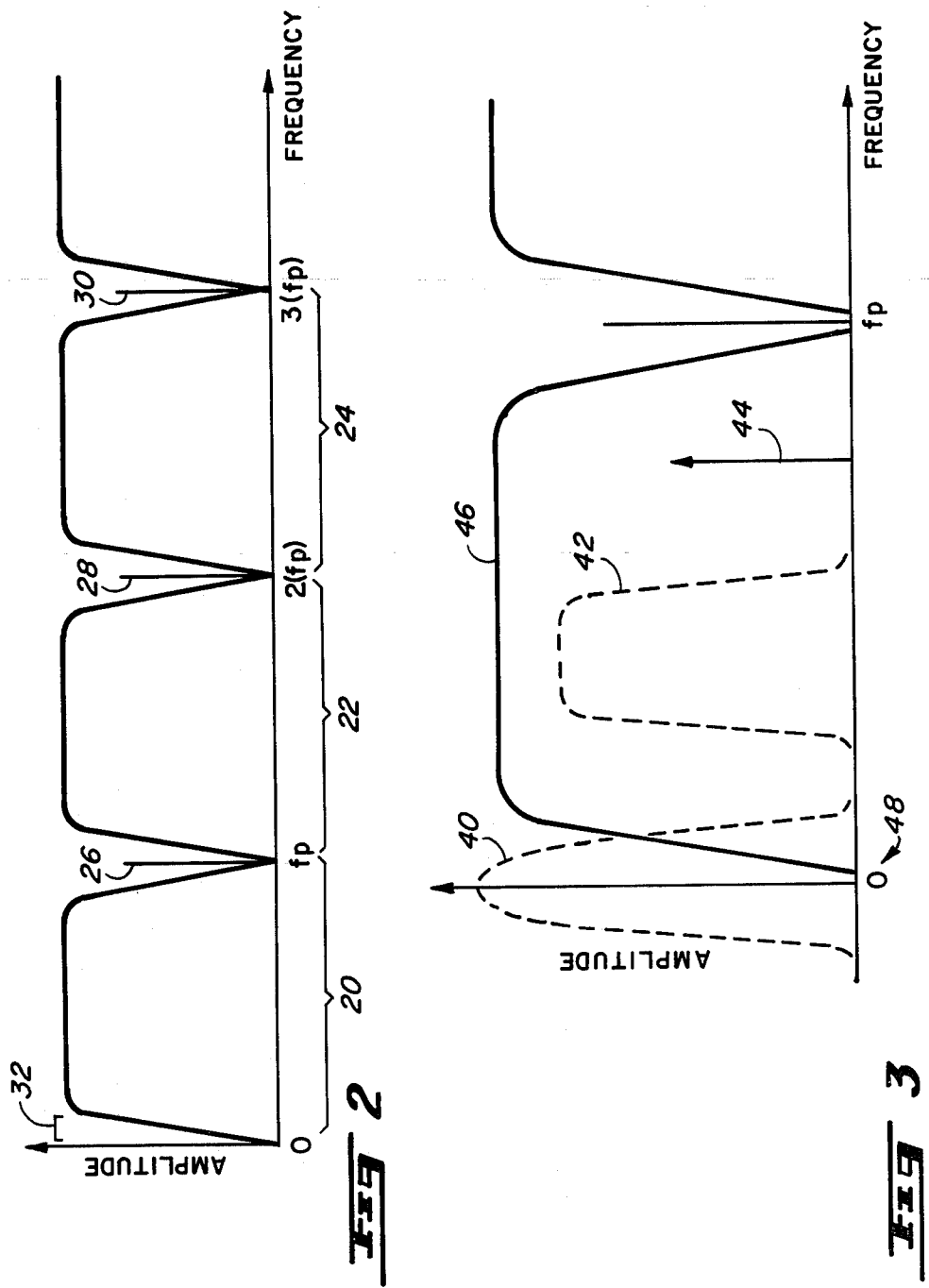

4,290,066

HIGH SPEED ADAPTIVE CLUTTER FILTER

FIELD OF THE INVENTION

The invention relates to a missile mounted pulse Doppler MTI radar which must operate in the search mode from an airborne launching vehicle such as an aircraft. The invention relates to problems which are created by relatively wide beamwidth antennas, fixed targets which appear to be moving because of the velocity of the launching aircraft and extremely wide range and velocity limits.

BACKGROUND OF THE INVENTION

Missile mounted radars used for acquisition and guidance of the missile to a target are frequently of the coherent pulse Doppler radar type. Generally they operate in a search mode to acquire a target and then lock on the target and track it while closing with the target. The searching process is complicated by relatively broad beam-width antennas due to the fact that overall diameters of antennas are limited by the cross-section of the missile, the imposition of clutter signals from the background where the target appears between the missile and the ground or sea, the possibility of an extremely fast closing rate between target and missile when the target and missile are traveling in or nearly in opposite directions, and the high likelihood that target return frequencies will be adjacent to high clutter return signals thereby making acquisition of the real targets even more difficult. Because the vehicle carrying the search radar is moving, ground targets all appear to be moving and have a Doppler return equal to the relative velocity between where the moving radar is looking and the fixed ground. Since the radar antenna does not have zero beamwidth there are quite different angles to different pieces of clutter even within the main beam. As a result the clutter is spread in frequency. This spread is minimized when the radar antenna is pointed along the longitudinal axis of the missile. While the frequency spread may be minimized under these conditions, the frequency shift, or Doppler, will be maximized. Under this condition the spectral width of the return clutter signal is minimum but the Doppler shift is maximum. When the antenna is pointed off to the side, the amount of Doppler shift will be less but the spectral spread will be increased.

Furthermore, signal strength varies according to the orientation of the ground with respect to the radar. If the radar beam looks at the ground and impinges thereon at a 90° angle (perpendicular), the reflected power will generally be maximized. If the impinging radar energy is at a low grazing angle, the return or reflected power will generally be lowered. Another aspect of the flight profile which affects the reflected power is range. It will be readily understood that the reflected power varies inversely with range. There are many combinations of the above conditions which provide a stronger clutter return from the ground than the signal from the target. The probability for this clutter to be within the passband of the radar receiver circuits is high since the radar itself is moving. If the dynamic range of the radar receiver is not able to handle a signal from a very small target simultaneously with that of very large clutter response, the clutter captures the receiver in the radar and drives the target signal down below the threshold device thereby making it unlikely that the radar will respond to the target. Since the radar search filter banks are generally designed to be as wide as possible in order to get as many simultaneous target returns as possible, the probability of having large clutter signals within the passband is enhanced.

Attempts to solve these problems in prior art radar systems have been limited to those which measure clutter over a long period of time in order to average the result. This period of time may be as long as one or two seconds. This averaging technique may not be used in the search portion of a missile guidance system since during that time, because of the extremely high closing rates involved between opposite traveling missile and target, the target might have evaded the missile before lock-on could occur. The long term averaging systems frequently use an AFC loop wherein the loop locks up and moves a filter notch out to the clutter and then dwells there for a very long time, in order to prevent an otherwise very noisy system. In a target acquisition system for a missile, this long period of time is not available. In addition, large frequency spreads are experienced due to the wide antenna beamwidth, and any device which continually blocked out all clutter frequencies would obscure almost all potential target frequencies.

The flight profile wherein the missile radar is looking for a target between the missile and the ground represents a small percentage of the total target volume, but without some system for reducing the clutter effect under these conditions, the acquisition system is not viable.

SUMMARY OF THE INVENTION

The above and other problems of the prior art are solved in accordance with the present invention by means of a high speed response circuit which looks at a given range interval for the reciprocal of the detection bandwidth (typically one to ten milliseconds) thereby limiting the frequency spread of the return signal and essentially narrowing the effective beamwidth of the antenna, determining whether or not there is a target within the range interval, if not, determining whether or not there was a threshold crossing within the range interval, in which case either the next range interval is called up (if no crossing is evident) or a determination is made that there was clutter crossing the threshold within the range interval. In the latter case, since there is no way of knowing whether the clutter is masking a target or not, the local oscillator frequency is shifted by an amount adapted to the location of the clutter return in frequency, so that the clutter return is now located out of the Doppler passband in that particular range interval, and then the range interval is again tested during a new dwell or look, for the presence of a target. The clutter has been placed in a notch allowing receiver sensitivity to increase for the possible target. The effect is to tremendously expand the dynamic range of the receiver. If no target is found on this second try, the system calls up the next range interval and the process is repeated. If a target is sensed the radar locks onto the target and tracks it. One of the outputs from the digital filter of the system provides information as to the bandwidth of the clutter and as a result the radar may shift that clutter into one of two different notches (in this embodiment) depending on whether it meets a narrow or a wide bandwidth criteria.

It is therefore an object of the invention to search a range interval within a very short period of time (within a radar look time) relative to the radar and missile operating speeds and determine whether clutter and/or target is present in said interval, and, if clutter is present, to react by filtering the clutter to allow the target to be detected.

It is another object of the invention to look for either target or clutter within a given range interval and upon sensing clutter to quickly change the local oscillator frequency to put the clutter in a notched filter before the next look period of the radar, in order to improve radar sensitivity to a nearby target.

It is still another object of the invention to provide high speed radar response to a moving target interposed between a missile and a background producing clutter as a result of missile velocity.

These and other objects of the invention will become more readily understood upon reading of the Detailed Description of the Invention which follows together with the drawings as follows, FIG. 1 is a representation of the scenario showing the radar carrying vehicle with respect to a possible target and the ground which produces background clutter, FIG. 2 is a graphic representation of the moving target indicator passband spectrum (at baseband) of a coherent pulsed Doppler radar system, FIG. 3 is a graphic representation of the moving target indication spectrum of FIG. 2 expanded on the frequency base, FIG. 4 is a block diagram of a typical radar acquisition channel, FIG. 5 is a block diagram depiction of a high speed clutter filter of the invention.

FIG. 6 is a detailed block diagram of a portion of FIG. 5,

FIGS. 7A-Care timing diagrams of portions of FIG. 5, and

FIG. 8 is a detailed block diagram of other portions of FIG. 5.

DETAILED DESCRIPTION OF THE INVENTION

Figure 5:
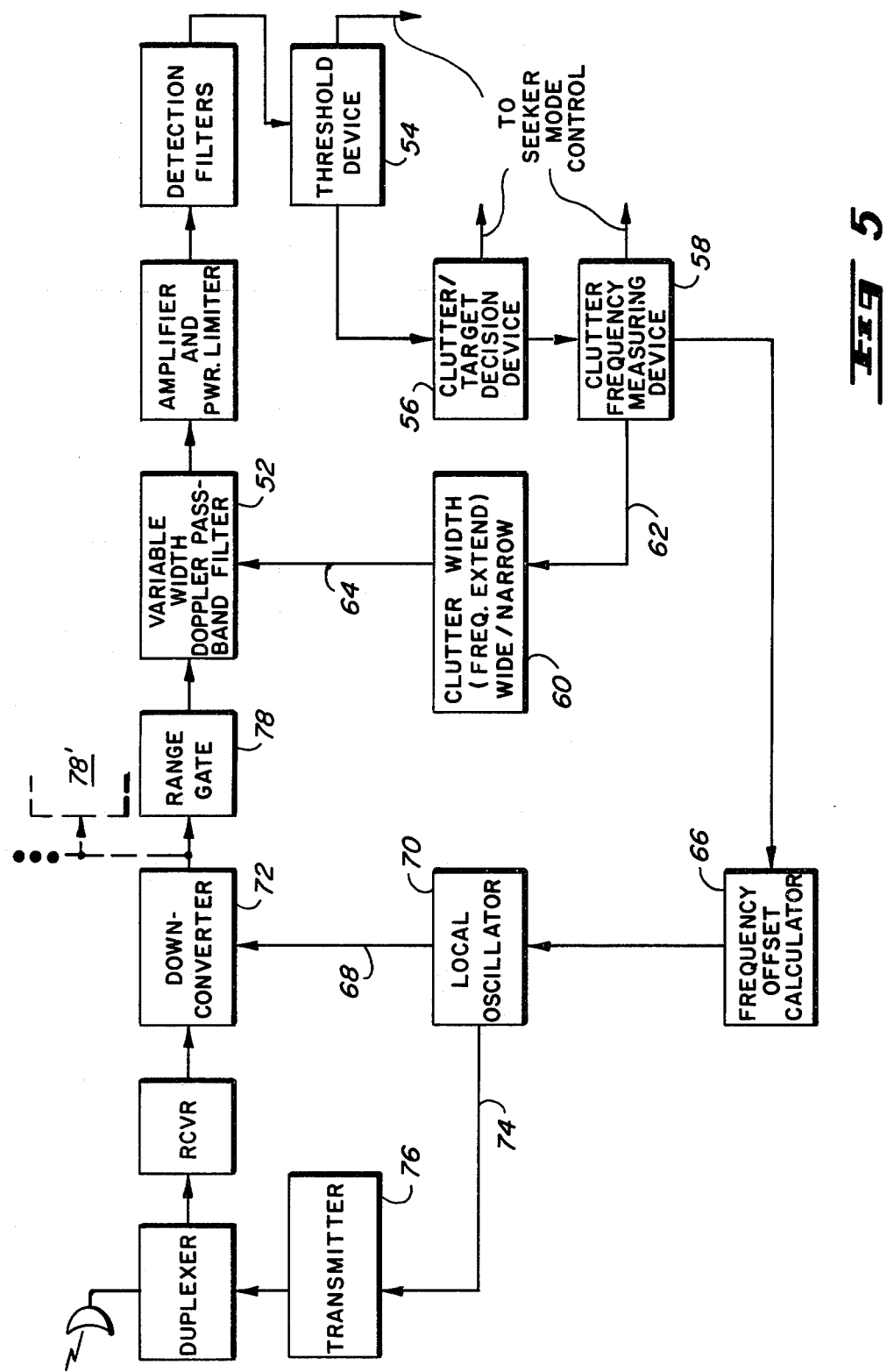

Referring first to FIG. 1, it may be seen that airborne vehicle 10 which is a carrier for a search/track radar (not shown) has a straight ahead velocity vector 12 and a radar look angle 14. Because of the small diameter of the housing for the missile radar antenna, the radar beamwidth is relatively wide as shown at 16. Beamwidth 16 impinges the ground or sea background 18 as shown. The reflections from ground 18 are clutter forming reflections because of the velocity of the vehicle 10 along path 12. Maximum Doppler is generated from the ground reflections in area 20 while minimum Doppler is generated from ground area 22. Clearly, then, the Doppler response from the background 18 varies within the beamwidth in terms of Doppler frequency. The range search intervals are shown as they appear on the ground to the radar. The extent of each range search interval depends upon the number of range gates in a given radar, and the width of each gate. Typically each interval would consist of several range gates to be searched simultaneously.

FIG. 2 graphically depicts the relationship between response and frequency of the Doppler returns from targets. Radar passbands are depicted at 20, 22 and 24. Regions 26, 28 and 30 which fall on the pulse repetition frequency (PRF), FP, 2(FP) and 3(FP) represent regions which would be at blind or ambiguous velocities. In each case, of course, the Doppler frequencies are the result of the differential velocity between the radar and the target. This spectrum represents the frequency content entering the radar in each range gate. Since the radar is moving with respect to the target and especially with respect to the background clutter objects which are not moving with respect to the ground in fact appear to be moving with respect to the radar. Area 32, an area of zero Doppler, represents a blind area in terms of targets which are moving at the same velocity as the radar.

FIG. 3 represents an expanded view of the graphical representation of FIG. 2. Signal response 40 is the clutter response the radar would see if the radar were not moving. The clutter response 42 is typical of that resulting from a moving radar. A true target might generate the typical Doppler response shown at 44. The basic problem inherent in this sort of a system is that the dynamic range of the system may not be large enough to linearly accommodate both the clutter 42 and target signals 44 simultaneously. The object of the present invention is to sense the presence of clutter 42 and then to move it into one of the notches which is available in the radar filter system so that only target 44 appears within the Doppler passband 46. By eliminating clutter 42 from the passband it may be seen that the dynamic range of the radar is no longer required to encompass both clutter signal 42 and target signal 44, but must only accommodate the target signal. If clutter signal 42 is moved into the zero frequency notch at 48, target signal 44 is also moved down in frequency but still appears within the Doppler passband 46.

FIG. 4 is a block diagram of a typical radar acquisition channel, well known to one of average skill in this art. FIG. 5 shows a detailed block diagram of the high speed clutter filter of the invention. It will be noted that some of the system depicted in FIG. 5 is the same or very similar to that depicted in FIG. 4, the prior art system. Note however that the Doppler passband filter 50 of FIG. 4 has been replaced with the variable width Doppler passband filter 52 in FIG. 5. While a two mode (wide or narrow) filter is disclosed in this embodiment, for simplicity, it will be understood by those skilled in the art that filters having many additional modes, or even continuously variable, are commercially available and might be used. Threshold device 54 and portions of the clutter/target decision device 56 are known in the art and may be found for example in U.S. Pat. No. 4,119,966, "Clutter Discriminating Apparatus For Use With Pulsed Doppler Radar Systems and the Like" by Bouvier et al. Clutter frequency measuring device 58 is used to measure both the center frequency and the bandwidth of the clutter. Clutter width (frequency extend) wide/narrow 60 accepts a signal 62 from clutter frequency measuring device 58 and determines whether the clutter bandwidth is relatively wide or narrow. Clutter width device 60 then sets variable width Doppler bandpass filter 52 to either a wide or narrow configuration under control of control line 64. Clutter frequency measuring device 58 also generates the center frequency of the clutter which is passed on to frequency offset calculator 66. Frequency offset calculator 66 is then used to control the output 68 from local oscillator 70 which is fed in turn to down converter 72. Another output 74 from local oscillator 70 is fed to transmitter 76 to ensure the phase coherence of local oscillator 70 and transmitter 76. However, output 74 from local oscillator 70 is not affected by frequency offset calculator 66 and always remains at a fixed frequency.

Figure 6:
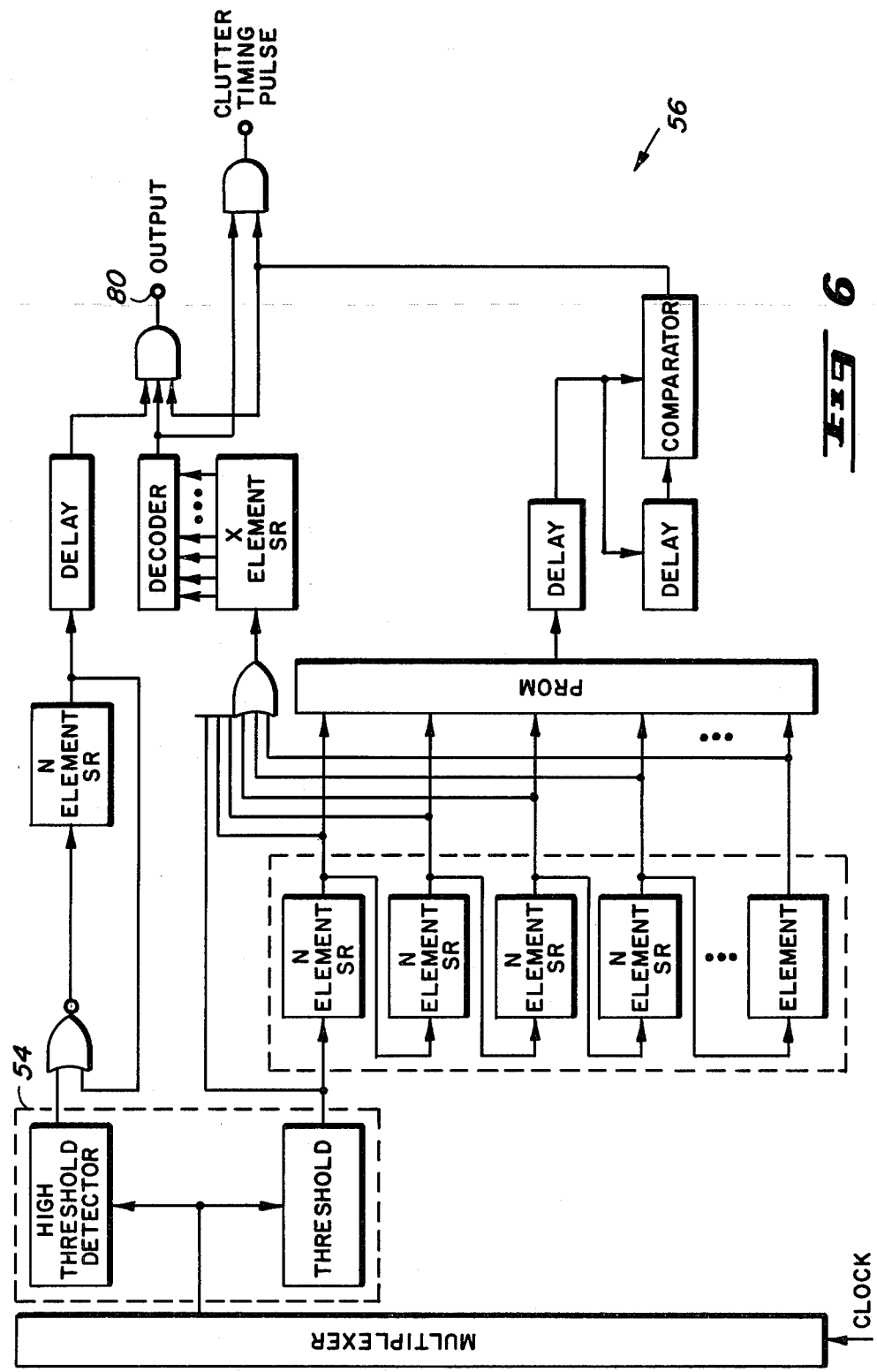
Figure 7:
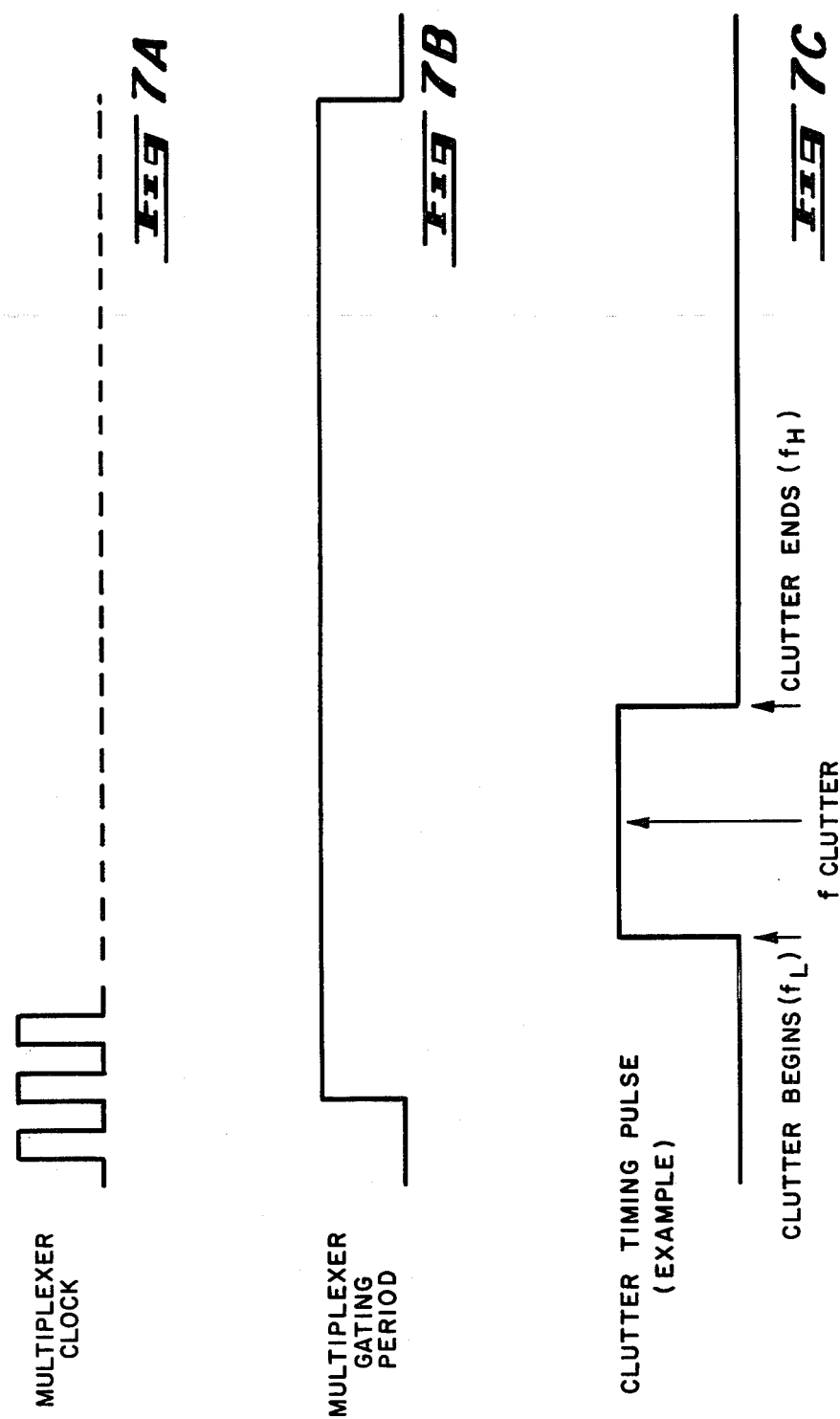

FIG. 6 illustrates the clutter/target decision device 56 in greater detail and, for convenience, a substantial portion of the clutter/target decision device employed in U.S. Pat. No. 4,119,966 is utilized. In this embodiment an additional NAND gate is used which also enables said device to provide a clutter timing pulse to the clutter frequency measuring device 58. The time relationship of the clutter timing pulse to the multiplexer clock (in the processor of FIG. 6) is shown in FIG. 7. The clutter timing pulse, FIG. 7(c), starts when the clutter/target decision device 56 recognizes clutter, during its scan of the multiplexed data representing the target returns at different frequencies. All of this occurs during the multiplexer gating period, FIG. 7(b), that is, when data is being read out of the processor concerning target or clutter amplitudes at different frequencies. The clutter timing pulse ends when the clutter/target decision device 56 stops sensing clutter. In this manner, a timing pulse is generated which correlates uniquely to a frequency location for clutter, and whose length in time represents the width of the clutter in frequency.

Figure 8:
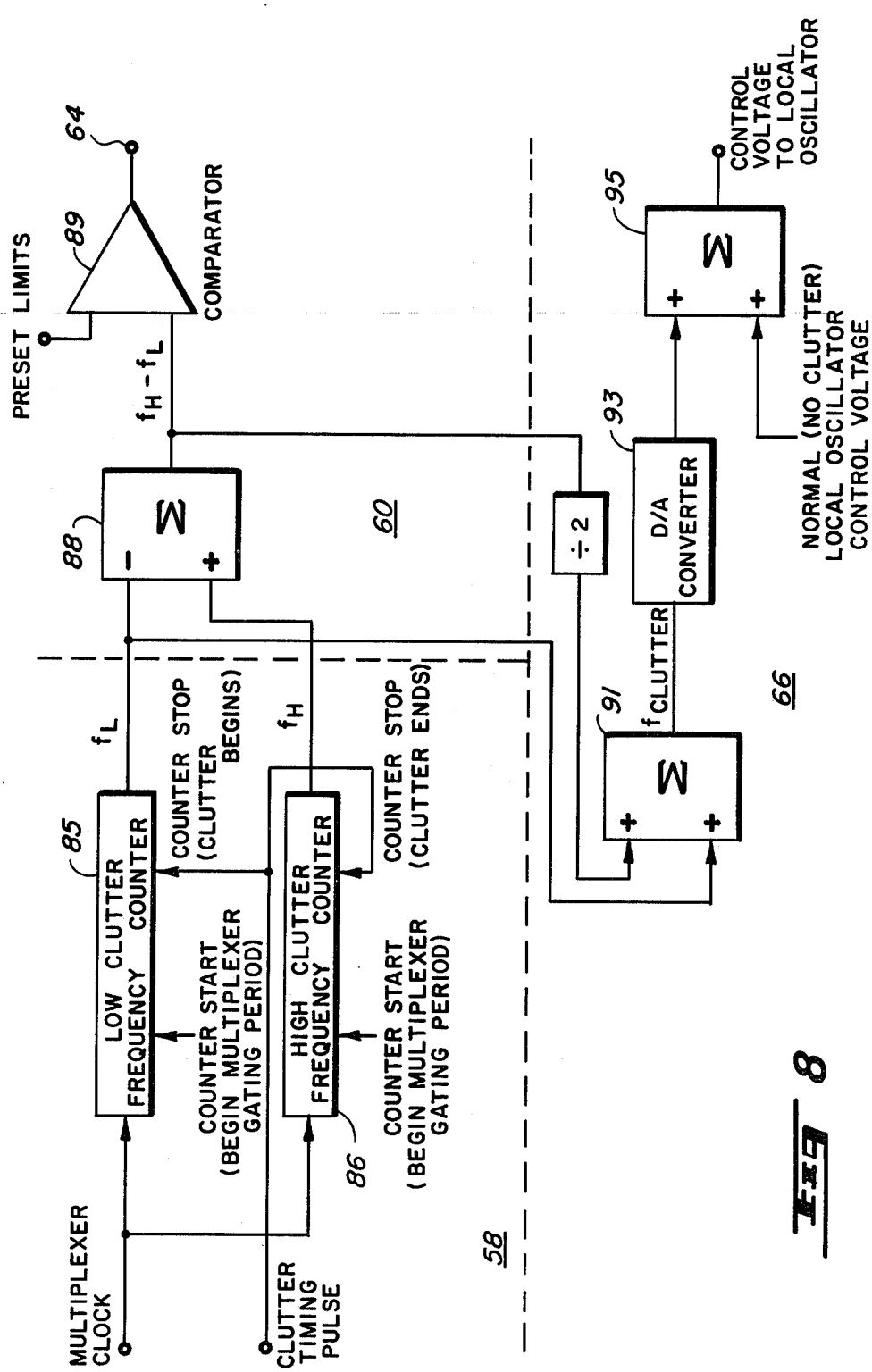

FIG. 8 presents a detailed block diagram of the clutter frequency measuring device 58, the clutter width wide/narrow device 60, and the frequency offset calculator 66. The operation of the clutter frequency measuring device 58 is as follows. The multiplexer clock drives two counters 85 and 86, and both counters begin counting at the beginning of each multiplexer gating period, that is, at the beginning of each processor readout time. (This is an example of a digital implementation. Another digital or even analog implementations are feasible.) The first counter, the low clutter frequency counter 85, stops counting at the beginning, or leading edge, of the clutter timing pulse, and the state of the counter 85 then represents the location in frequency where the clutter begins in frequency, $f_L$. The second counter, the high clutter frequency counter 86, stops counting at the end of the clutter timing pulse. The state of this counter 86 then represents the location in frequency where clutter stops, $f_H$.

The operation of the clutter width wide/narrow device 60 is as follows. The location of the low frequency of clutter is subtracted from the high frequency location in a summing device 88, providing the width of the clutter in frequency, $f_H - f_L$. This quantity is then compared with preset limits in a comparator 89 for allowable clutter width, and a decision is made whether the clutter is "narrow" or "wide", and the appropriate clutter filter is then selected in the variable width Doppler bandpass filter 52.

The operation of the frequency offset calculator 66 is as follows. The low frequency measurement of the clutter is added in a summing device 91 to one-half the width of the clutter, providing the center frequency of the clutter. That is, $$f_{clutter} = f_L + (f_H - f_L/2)$$

This clutter frequency is then converted in a D/A converter 93 to an analog voltage, in this implementation, and summed in a summing device 95 with the normal, or no-clutter, voltage controlling the local oscillator. Thus, when clutter is present and a new dwell is called for, the oscillator is offset by the clutter frequency, thus placing the center of the clutter spectrum in the Doppler filters.

In operation the circuit of FIG. 5 feeds radar responses to one of several range gates 78. After processing this signal through range gate 78 and the accompanying circuitry, clutter/target decision device 56 determines whether either clutter or target is present within a range gate 78. If a target is present the radar locks onto the target and proceeds to track it with no further requirement for search processing of the signal. If no target is determined by device 56 (output 80) but clutter is determined, clutter frequency measuring device 58, clutter width frequency extend wide/narrow 60 and frequency offset calculator 66 are utilized to shift the clutter into a notch which is controlled in bandwidth by device 60. This is accomplished by shifting output 68 of local oscillator 70 to place the center frequency of the clutter in the selected notch. This shifting is accomplished before the next radar look period. The range interval is again tested for a target by clutter/target decision device 56. If a target is present on output 80 the radar reverts to a tracking mode and proceeds to track the target. If no target response is seen on output 80, the radar shifts to the next range interval, and proceeds to repeat the entire procedure. No frequency locked loop or AFC loop is required as in the prior art and therefore response time is in the vicinity of the reciprocal of the detection bandwidth, typically one to ten milliseconds.

In addition, the width of clutter filtered is only wide enough to notch the clutter in each range interval, not all range intervals as would be necessary using prior "long term" tracking techniques. It is seen by one skilled in the art that minimizing the frequency span which must be filtered at any given time will maximize the frequency span where targets may appear, thus improving target detection probability in a clutter environment.

While I have shown and described a specific embodiment of this invention, further modifications and improvements will occur to those skilled in the art. I desire it to be understood, therefore, that this invention is not limited to the particular form shown and intend in the appended claims to cover all modifications which do not depart from the spirit and scope of this invention.

I claim:

1. In an airborne coherent pulsed Doppler radar system having a receiver comprising a local oscillator, a method of suppressing clutter in order to put nearby desired targets within a useful dynamic range of the radar system, comprising the steps of:
   (a) sensing a presence of clutter in a specified range interval;
   (b) measuring a center frequency of said clutter during the radar look time;
   (c) moving the local oscillator output frequency by an amount equal to said center frequency of said clutter before the onset of the next look time of the radar;
   (d) sensing for a target presence within said range interval; and
   (e) repeating steps (a), (b), (c) and (d) in sequential range intervals until a target is sensed, with each range interval having a different, adaptive clutter notch.

2. The method according to claim 1 further comprising the steps of:
   (f) measuring a bandwidth of said clutter;
   (g) setting bandwidth of a variable bandwidth notched filter in response to said measured bandwidth; and (h) passing said clutter through said notched filter to eliminate the effect of said clutter on the radar receiver.

3. An improvement in an airborne coherent MTI pulsed Doppler radar comprising in combination:
   means for sensing frequency characteristics of a clutter signal in a range interval, during the normal look time of the radar;
   means for shifting a local oscillator frequency of a receiver of the radar responsive to said sensing of clutter frequency characteristics;
   means for sensing a target signal in said range interval after shifting the oscillator frequency to place the clutter signal in a filter;
   means for sequentially shifting said sensing means to at least one subsequent range interval absent said sensing of the clutter signal and said sensing of said target signal in said first range interval; and
   means for tracking a sensed target and for inhibiting further operation of said sensing means and said shifting means responsive to said target signal sensing.

4. The radar system according to claim 3 wherein said sensing means further comprises:
   means for measuring a bandwidth of said clutter signal;
   means for adjusting a notched filter bandwidth responsive to said measured clutter signal bandwidth, said clutter signal being passed through said notched filter to desensitize the response of a receiver of the radar to said clutter signal.

* * * * *